5 Sheets—Sheet 3.

L. B. MILLER & P. DIEHL.
Sewing-Machine.

No. 208,838. Patented Oct. 8, 1878.

Witnesses
W. C. Bannem.
W. H. Isaacs.

Inventor's
L. B. Miller
Phillip Diehl
by their atty
C. S. Renwick

5 Sheets—Sheet 4.
L. B. MILLER & P. DIEHL.
Sewing-Machine.
No. 208,838. Patented Oct. 8, 1878.
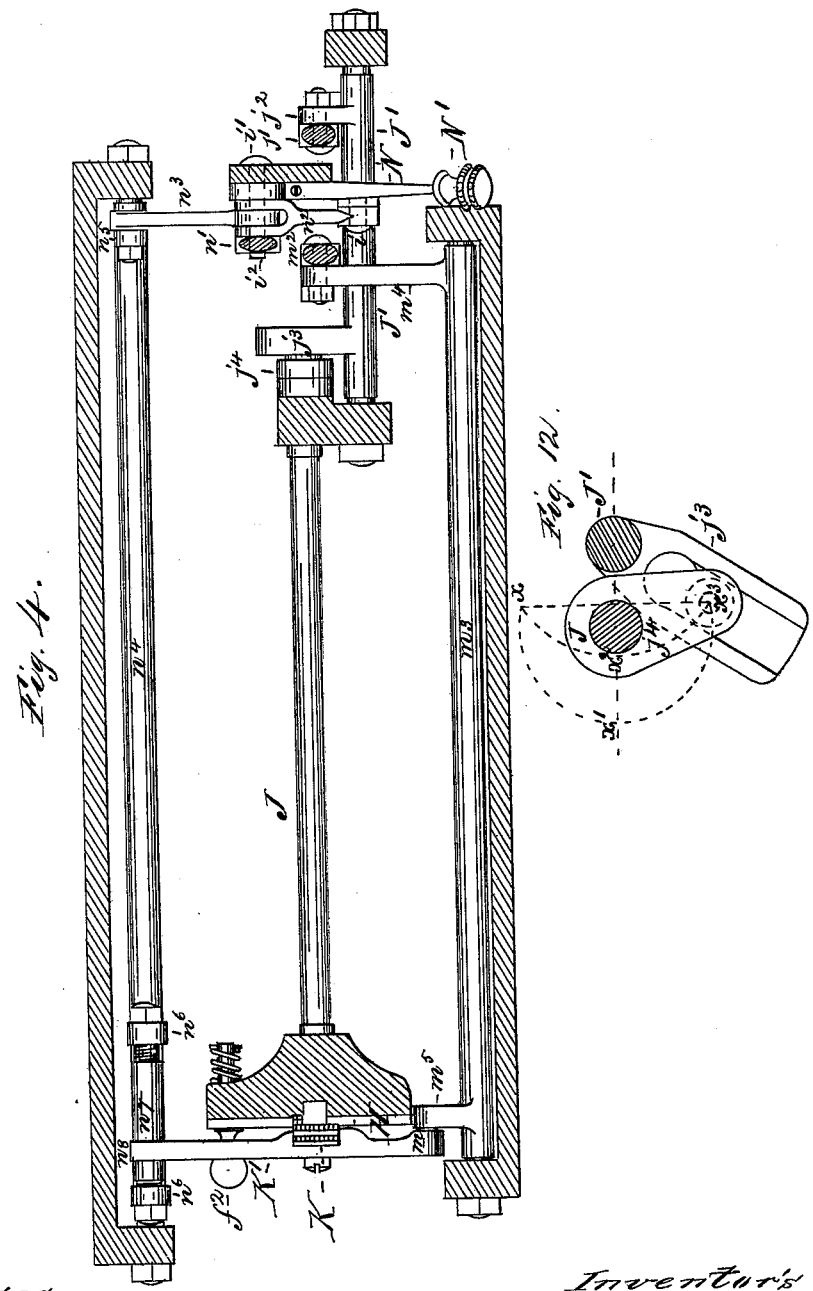

5 Sheets—Sheet 5.
L. B. MILLER & P. DIEHL.
Sewing-Machine.
No. 208,838. Patented Oct. 8, 1878.
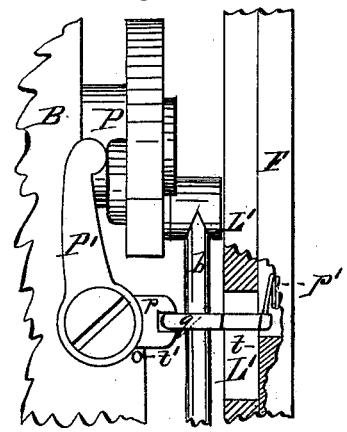
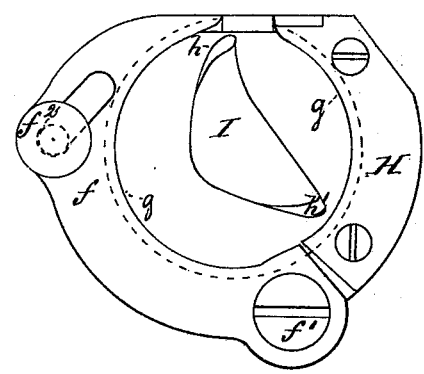
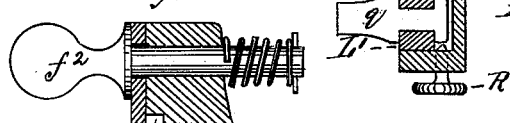
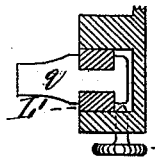
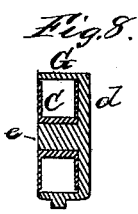
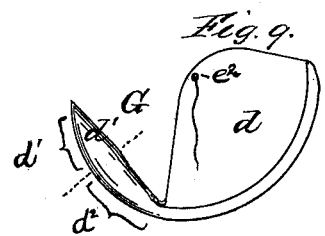
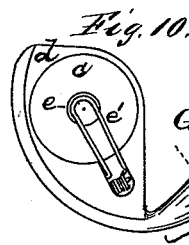
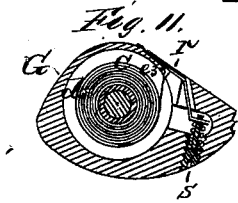
Witnesses
W. L. Benners.
W. H. Isaacs.
Inventors
L. B. Miller
Philip Diehl
by their atty.
E. S. Renwick

UNITED STATES PATENT OFFICE.

LEBBEUS B. MILLER AND PHILLIP DIEHL, OF ELIZABETH, N. J., ASSIGNORS TO THE SINGER MANUFACTURING COMPANY, OF NEW YORK, N. Y.

IMPROVEMENT IN SEWING-MACHINES.

Specification forming part of Letters Patent No. 208,838, dated October 8, 1878; application filed June 8, 1877.

*To all whom it may concern:*

Be it known that we, LEBBEUS BALDWIN MILLER and PHILLIP DIEHL, both of Elizabeth, in the county of Union and State of New Jersey, have made an invention of certain new and useful Improvements in Sewing-Machines; and that the following is a full, clear, and exact description and specification of the same.

The invention has reference to the shuttle mechanism of sewing-machines, the feed-mechanism, and the presser-foot mechanism thereof; and consists of certain constructions and combinations of mechanical devices, which are set forth in detail in the claims at the close of this specification. All of the said features of invention need not necessarily be embodied in the same machine; but in order that the invention may be fully understood, we have represented in the accompanying drawings, and will proceed to describe, the principal parts of a sewing-machine embodying all of the said features in the best form in which we have embodied them at the present date.

Figure 1:
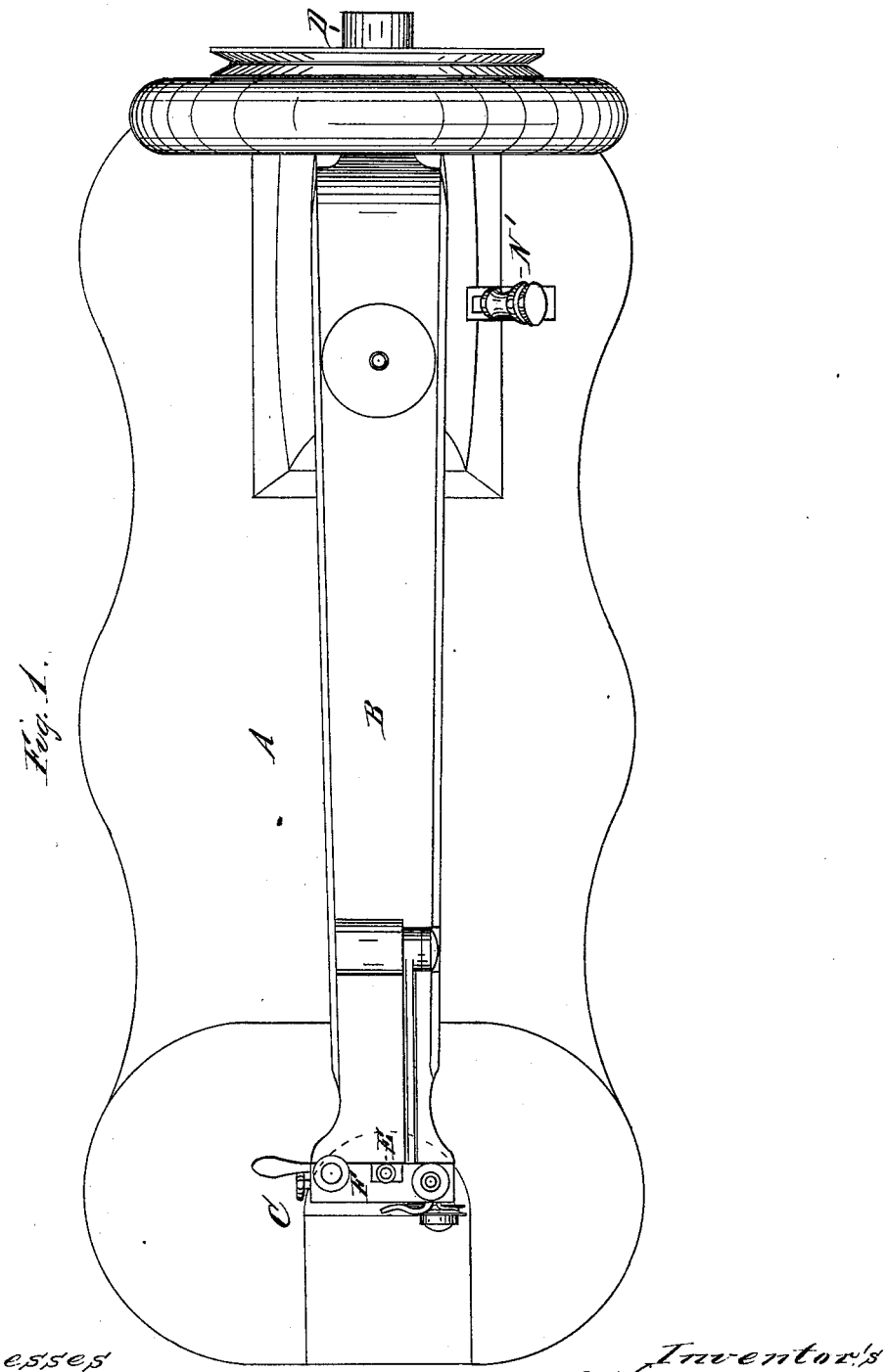
Figure 2:
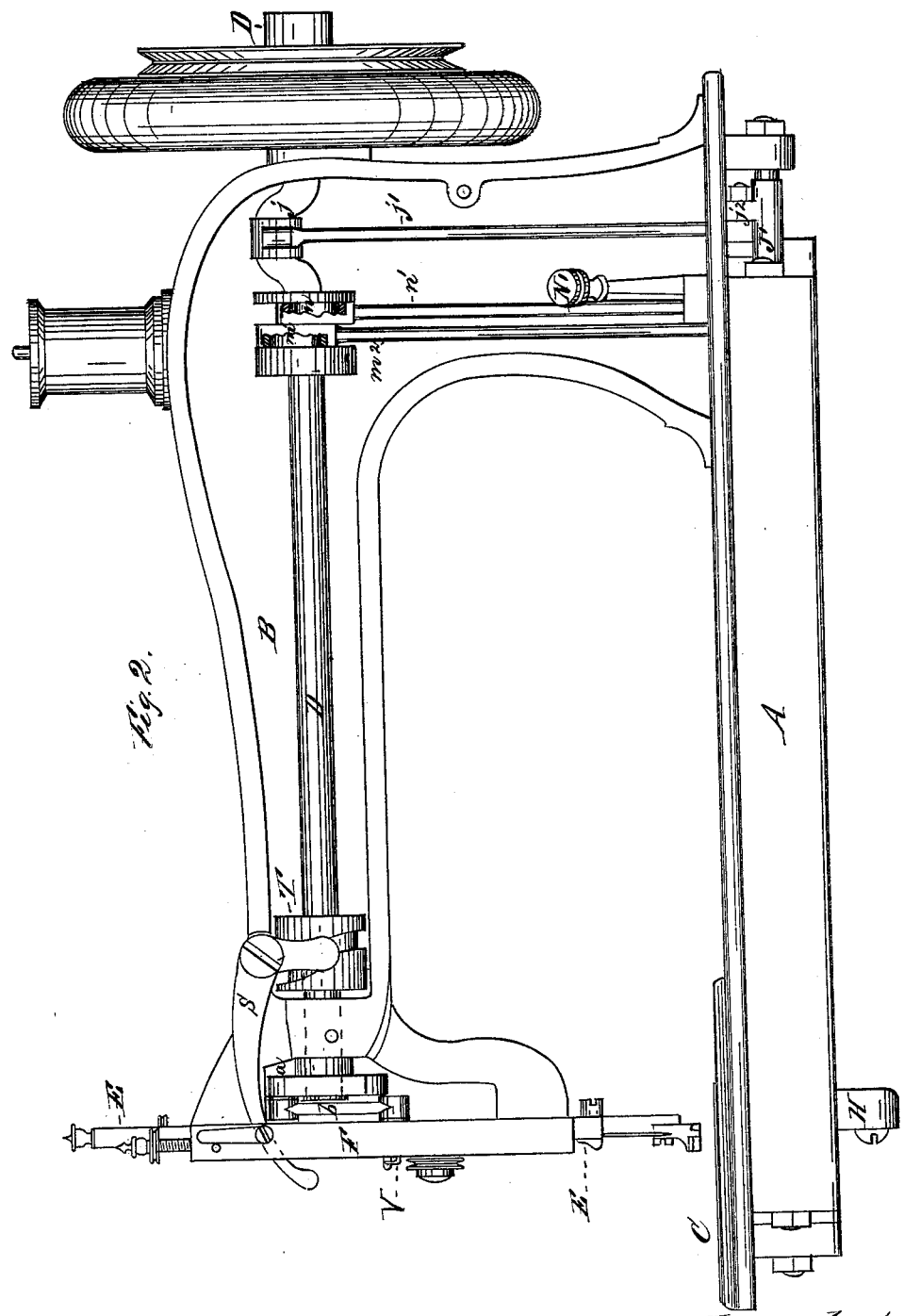
Figure 3:
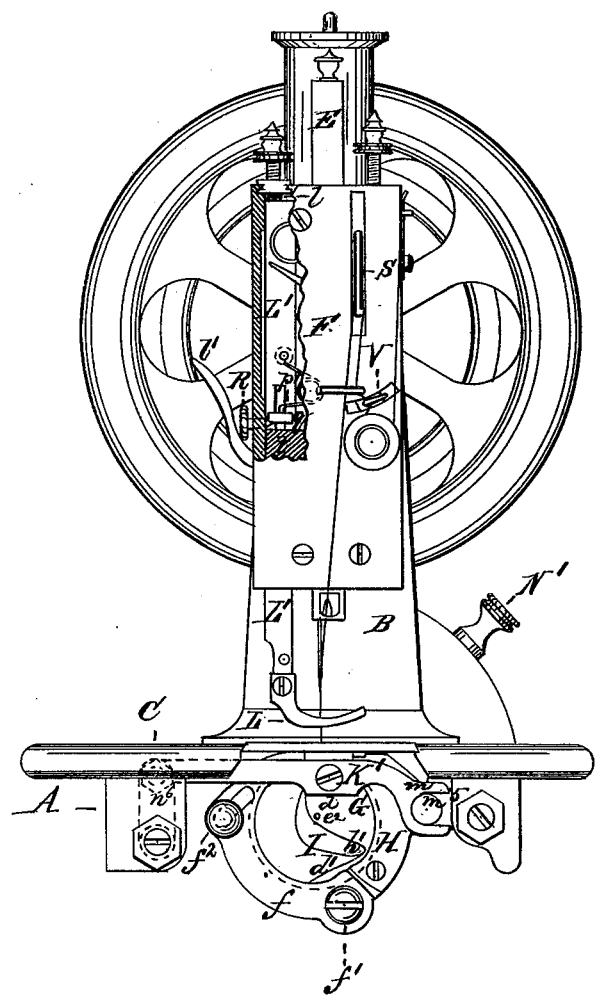

In the said drawings, Figure 1 represents a top view of the said sewing-machine. Fig. 2 represents a side view of the same, with the side plate of the needle-arm removed. Fig. 3 represents an end view of the same. Figs. 4 to 15, inclusive, represent views of parts of the machine detached from the residue.

The general form of the sewing-machine represented in the said drawings does not differ materially from that of many shuttle-machines in common use, there being a bed-plate, A, with which the other parts are connected; a strong arm, B, to support the needle-bar above the cloth-plate C of the bed A; and a driving-shaft, D, extending through the needle-arm B, to drive the needle-bar. The needle-bar E is arranged to slide up and down in the head F of the needle-arm B, and motion is transmitted to the needle-bar E from the driving-shaft D through the intervention of a crank-pin, $a$, and a connecting-rod, $b$.

The under thread, which is interlooped with the needle-thread to form the stitch, is, according to this invention, carried by an oscillating shuttle, G, which is caused to oscillate in a circular shuttle-race, H, by means of an oscillating shuttle-driver, I, carried by the shuttle rock-shaft J, which is arranged below the table-plate C of the machine.

The shuttle consists mainly of three principal parts, firmly combined or connected together, these three parts being the bobbin-case $d$, the beak proper $d^1$, and the beak-shank $d^2$, Figs. 9 and 10.

The bobbin $c$ is made in the form of a flatted spool, whose thickness is less than its diameter, and the cavity of the shuttle in which it is held is of the same form, and is fitted with a central pivot, $e$, upon which the spool-bobbin revolves. This pivot is arranged parallel with the axis of the shuttle-driver shaft J, so that the spool-bobbin sets edgewise in the shuttle, and it is held in place by means of a spring-latch, $e^1$. The thread from the bobbin is conducted to the delivery-eye $e^2$ of the shuttle, but in its passage to that eye is operated upon by a thread-tension, by means of which the tension upon the shuttle-thread can be varied.

The shuttle-thread tension consists, in this instance, of a spring pressure-plate, $r$, which is sunk in a recess in the periphery of the shuttle, and presses the thread between its inner surface and that of the bottom of the recess. The pressure-plate is connected at its shank with a regulating-screw, $s$, which can be turned to adjust the amount of pressure upon the thread, and consequently its tension or resistance to being pulled from the shuttle. The shuttle-thread is guided to the thread-tension by an internal eye, $e^3$, through which the thread passes from the spool-bobbin. The external profile of the bobbin-case portion of the shuttle is a pointed oval, whose exterior curve corresponds with the circle of the shuttle-race. This bobbin-case is preceded by the beak proper $d^1$, whose office is to enter the loop of needle-thread presented by the needle and by the beak-shank $d^2$, which intervenes between the beak proper $d^1$ and the bobbin-case $d$, and whose office is to hold the said loop while the needle is rising until the needle-eye is clear of the work being sewed, but without material elongation of the loop, so as to obviate the pulling of the thread downward through the needle-eye while it is in the work, and the great friction upon the thread incident to that mode of operation.

In order that the friction upon the needle-thread may be reduced to the lowest limit during the rise of the needle-eye through the work, the thread is permitted to rise with the needle until the needle-eye is clear of the work, and this rise is permitted by the beak-shank $d^2$, which, commencing, as seen in Figs. 9 and 10, at the butt of the beak proper $d^1$, diminishes in cross-section as it approaches the bobbin-case $d$. The butt of the beak proper (indicated by the dotted cross-lines in Figs. 9 and 10) corresponds in position with the position of the needle when its eye during rising is just below the work, or thereabout; hence, when the needle-eye rises through the work, the reduced shank of the shuttle-beak moving through the loop of needle-thread permits it to contract, and consequently permits the needle-thread to move upward through the work with the needle in its ascent. By the continued forward oscillation of the shuttle in its race, the bobbin-case of the shuttle follows the beak-shank $d^2$, and by its oval form spreads or extends the loop sufficiently to permit the bobbin to pass through it; but as this spreading is done after the needle has risen through the work, the whole area of the needle-hole is free for the movement of the needle-thread, which, in consequence, is then readily drawn down through the needle-hole to form the extended loop.

The advantages incident to the construction of the shuttle with a beak-shank, $d^2$, intervening between the beak proper $d^1$ and the bobbin-case, although attained most readily with an oscillating shuttle, are not restricted to the latter, because a shuttle fitted to move in a straight shuttle-race may be constructed with a beak-shank succeeding the beak proper and preceding the bobbin-case, provided the extent of movement of the shuttle be sufficient to permit this construction.

The circular shuttle-race H is constructed with an internal peripheral groove, $g$, to receive and guide the rim of the shuttle; and a segment, $f$, of the front side of this groove is constructed to turn edgewise upon a pivot, $f^1$, so as to form a gate, which can be turned out of the way to open the groove for the insertion and removal of the shuttle from the shuttle-race. This gate $f$ is secured by a spring-pin, $f^2$, which is passed through a slot made in the gate for that purpose. The shuttle-driver I has two horns, $h$ $h'$, which operate upon the shuttle to drive it. One of these horns, $h$, bears against the butt of the shuttle when driving it forward. The other horn, $h'$, bears against the forward end of the bobbin-case of the shuttle, near the butt of the shuttle-beak. There is sufficient play between the horns and the shuttle for the passage of the loop of thread between them. The shuttle rock-shaft J is driven from the driving-shaft D above by means of a crank, $j$, connecting-rod $j^1$, intermediate rock-shaft J', and arms $j^2$ $j^3$ $j^4$, two of which, $j^2$ $j^3$, project from the intermediate rock-shaft J', and the other from the shuttle rock-shaft J. The adjacent arms $j^3$ $j^4$ of the two rock-shafts J J' are connected by means of a pivot and friction-wheel, secured to one arm, $j^4$, and working in a slot of the other arm, $j^3$. The object of the intermediate rock-shaft J' is to enable the shuttle rock-shaft J to be rocked through an arc of greater extent than would be convenient if the connecting rod $j^1$ from the crank should be connected directly with the arm of the shuttle rock-shaft. This object is attained by the arrangement of the axes of the two rock-shafts in a plane passing through the middle of the vibrations of the arms, or thereabout, and by constructing the arm $j^3$ of one rock-shaft, J', to lap by the axis of the other rock-shaft, J, so that the curves described by the arms of the two rock-shafts intersect each other. Hence, although the straight line extending between the two extreme positions of the centers of the pivot connecting the arms, as represented by the dotted lines $x$ $x^3$, Fig. 12, is the same for both arms, the arc described by the shorter arm, $j^4$, appertaining to the shuttle rock-shaft, as represented by the dotted line $x$ $x^1$ $x^3$, Fig. 12, is of much greater angular extent than the arc described by the arm $j^3$ of the intermediate rock-shaft, as represented by the line $x$ $x^2$ $x^3$, Fig. 12.

The delivery-eye $e^2$ of the shuttle is, at its inner edge, near the center of the circular shuttle-race, so that the distance from the delivery-eye to the sewing-point remains approximately the same, notwithstanding the change in the position of the shuttle in its race; but the delivery-eye is not at the said center or axis of oscillation of the shuttle, but is purposely arranged at a short distance from that axis, and at the side thereof which is nearer the outer rim of the shuttle. Hence, when the shuttle is retrograded by the return movement of the oscillating shuttle-driver I the descent of the delivery-eye, or its movement from the work, exerts a pull upon the shuttle-thread and draws it home to finish the stitch.

The work is fed past the line of movement of the needle by means of a feed-dog, K, which is secured to a feed-bar, K'. This feed-bar is caused to rise and fall crosswise of its length, so as to take hold of the work and to release it; and is also caused to move to and fro longitudinally, so as to move the work or feed it and to retrograde preparatory to making each fresh feeding movement. The rising and descending movements of the feed-bar K' are effected by connecting one end, $m$, of it with the driving-shaft, through the intervention of a cam, $m^1$, connecting-rod $m^2$, and rock-shaft $m^3$, fitted with two arms, $m^4$ $m^5$, one of which, $m^4$, is connected by a pivot with the connecting-rod $m^2$, while the other, $m^5$, is fitted with a pivot, which is received in a slot formed in the end $m$ of the feed-bar K′. The rock-shaft $m^3$ is arranged at one end of the feed-bar, and the arm $m^5$ of the rock-shaft is so arranged as to extend lengthwise of the feed-bar and parallel, or thereabout, therewith. When the arm is at the middle of its vibrating movement, its vibration effects the rise and descent of the feed-bar. The feed-bar is caused to move to and fro longitudinally by connecting it with the driving-shaft D by means of a cam, $n$, connecting-rod $n^1$, toggle-links $n^2$ $n^3$, and rock-shaft $n^4$, fitted with arms $n^5$ $n^6$ $n^6$, to one of which one end of the toggle-links is applied, while the other two arms, $n^6$ $n^6$, hold a pivot, $n^7$, which connects them with the end $n^8$ of the feed-bar. As the pair of arms $n^6$ $n^6$ are upright, or thereabout, at the middle of their vibrating movement, and they then stand crosswise of the length of the feed-bar K′, their vibration causes the longitudinal movement of that bar. The rock-shaft $n^4$ is arranged at the end of the feed-bar opposite that which the rock-shaft $m^3$ is arranged, and the two rock-shafts support the feed-bar between them. In order that the extent of the longitudinal movement of the feed-bar may be varied for the purpose of varying the length of feed, the fulcrum-pivot $i$ of the toggle-links $n^2$ $n^3$, at the end thereof which is farthest from the arm $n^5$ of the rock-shaft $n^4$, is not fixed, but is secured to an adjusting-arm, N, so that it may be moved. The axis of the pivot $i^1$ of this adjusting-arm is set near the axis of the pivot $i^2$, which connects the connecting-rod $n^1$ with the elbow-joint of the toggle-links, the length of the adjusting-arm N between the axis of its own pivot $i^1$ and the axis of the fulcrum-pivot $i$, which connects the arm with the end of the toggle-links, being the same, or thereabout, as the length of the adjacent toggle-link $n^2$. Hence the fulcrum-pivot $i$ of the toggle-links can be raised or depressed by moving the adjusting-arm N up or down; and the effect of this movement is to make the links form a greater or less angle with each other at the time when the feed-bar is retrograded to its most backward position. The greater the angle which the links form with each other the more will the arm $n^5$ of the rock-shaft be vibrated when the elbow-joint of the links is raised to straighten the two into line, or thereabout, and the greater will be the feeding-movement of the feed-bar. Hence the feeding-movement can be varied, as required, by raising or depressing the adjusting-arm N, so as to raise or depress the fulcrum-pivot of the toggle-links $n^2$ $n^3$.

In order that the adjusting-arm may be moved conveniently, its end is extended through a slot in the casing of the machine, and is fitted with a handle, N′. This system of operating the feed-dog through the intervention of toggle-links having an adjustable fulcrum-pivot possesses the advantages of making the movement of the feed-dog positive in both directions, of dispensing with a spring to retrograde the feed-dog, and of making the movement practically noiseless.

It is not, however, essential that the connections between the toggle-links and the feed-bar should be precisely such as are shown in the drawings, as the form and construction of these connections may be varied, as found expedient.

The work to be sewed is held to the surface of the feed-dog K by means of a presser-foot, L, which is pressed downward by a spring, $l$, working in a socket in the upper end of the presser-bar L′, and a lever, $l'$, is provided to lift and lower the presser-foot when the work is to be entered or withdrawn from the machine. A presser-foot operated by a spring exercises a constant pressure upon the work; but it is expedient to relieve this pressure at times when the needle is in the work, so as to enable the work to be more readily turned when sewing curved seams, and also when the seam is sewed over a lap or doubled portion of the fabric. This relief is generally effected by hand; but in order that the pressure of the presser-foot in the machine we are describing may be relaxed automatically, when required, a special lifting mechanism is provided for the purpose. To this end a cam, P, is connected with the driving-shaft, for the purpose of lifting the presser-foot slightly at each revolution of the driving-shaft. This cam operates upon an elbow-lever, P′, which is pivoted to the needle-arm B, and has the end of its horizontal arm $p$ slotted to receive one end of a cramp-stud, $q$, which is thus raised and allowed to descend by the action of the cam P. The shank of this stud is inserted in a slot formed in the bar L′ of the presser-foot, and projects laterally from it, the sides of the stud being notched to embrace the sides of the presser-bar, so that the stud is combined directly with the presser-bar without the intervention of any intermediate device. The fit of the notches of the stud upon the presser-bar is loose, so that the presser-bar may be moved up and down in the notches as long as the stud stands at right angles, or thereabout, with the presser-bar; but the upward movement of the stud by the movement applied to its outer end by the lever P′ cramps the stud upon the presser-bar, so that the latter is then grasped and lifted with the stud, and when the stud is lowered the presser-bar is lowered with it. In order that the presser-foot may be free to rise and descend at times when the stud is not being lifted or lowered, a stop, $t$, is formed in the head F of the needle-arm B, to stop the descent of the shank of the stud a little before the outer end of the stud reaches the limit to which it is lowered by the cam P, so that the continued downward movement of the outer end of the stud, after its shank is stopped by the stop, rocks the stud upon the presser-bar, causing the stud to stand, when in its lowest position, at right angles with the presser-bar, and frees the bar from the grasp of the stud. The rocking of the stud in the opposite (or upward) direction when the cam raises the outer end of the stud is insured by the action of a small spring, $p'$, placed in the head of the needle-arm, which spring slightly resists the raising of the shank of the stud when its head is raised by the cam and lever, and thus insures the cramping of the shank of the stud upon the presser-bar.

A stop-pin, $t'$, is provided to determine the position of the elbow-lever, and consequently of the head of the stud, when the cam is not acting on the stud. In consequence of the freeing of the grasp of the stud upon the presser-bar at all times, except when the cam P is operating upon the stud, the presser-bar is free to vary its position according to the varying thickness of the work; but as the stud works upon the presser-bar with the capacity to grasp any part of the presser-bar which may be embraced by it, the stud when operating will always raise the presser-bar and presser-foot a fixed distance, however the distance between the presser-foot and the table-plate may vary by reason of variations in the thickness of the work being sewed. The lifting mechanism thus adjusts itself to the variations in the thickness of the work without requiring any attention on the part of the operator for such adjustment. In order that the lifting mechanism may, however, be thrown out of operation when it is not required to work, a conical-pointed stop-screw, R, is provided to screw through a hole in the needle-arm head F, in a position to pass below the shank of the cramp-stud $q$, and raise it at least as high as the cam P can raise it. When, therefore, the stop-screw is turned inward, the cramp-stud becomes for the time inoperative. In order that the conical point of the stop-screw may operate properly upon the stud, the under side of the shank of the stud is beveled so as to form an incline plane, upon which the conical point of the stop-screw acts as a wedge. The cam for operating the stud and the stop-pin may, of course, be replaced by equivalent mechanical devices or substitutes for performing their respective functions.

The loop of needle-thread is taken up after the passage of the shuttle mainly by means of a vibrating take-up lever, S, operated at the proper times by a cam, T, upon the driving-shaft; but a vibrating yielding spring take-up, V, is employed in connection with the positive take-up lever S to hold the needle-thread with a yielding force, and adapt the size of its loop more perfectly to the irregular form of the shuttle than would be possible with a positive take-up without involving great care and expense in the formation of the take-up cam.

As the parts of the machine which have not been described need not differ substantially from those of sewing-machines in common use, it has not been deemed necessary to describe them.

We claim as our invention—

1. The shuttle for a sewing-machine constructed, substantially as before set forth, with a bobbin-case, with a beak proper to seize the loop of needle-thread, and with a beak-shank, which intervenes between the beak proper and the bobbin-case and does not increase in cross-section as it extends from the beak proper toward the bobbin-case, whereby the loop of needle-thread, after being seized, may be held without being progressively elongated while the needle point-rises through the cloth.

2. The shuttle for a sewing-machine constructed, substantially as before set forth, with the bobbin-case, with a beak proper to seize the loop of needle-thread, and with a beak-shank which not only does not increase in cross-section as it extends from the beak proper toward the bobbin-case, but is reduced in cross-section as it extends from the former toward the latter, whereby the needle-thread held on the said beak-shank may be permitted to contract and the needle-thread to rise through the cloth while the beak-shank advances in the said loop.

3. The combination, substantially as before set forth, of the circular shuttle-race, the shuttle-driver, and the shuttle constructed with a bobbin-case, with a beak proper, and with a beak-shank which intervenes between the bobbin-case and the beak proper, and which does not increase in cross-section as it extends from the beak proper toward the bobbin-case.

4. The combination, substantially as before set forth, of the shuttle-driver, the rock-shaft to one end of which it is fixed, the rock-shaft connected with the driving-shaft, the arms on the respective rock-shafts, and the pivot connecting said arms, the arrangement of the parts being such as described, so that the shuttle-driver is caused to move a greater angular distance than the intermediate rock-shaft, through which it is driven.

5. The combination, substantially as before set forth, of the circular shuttle-race, the oscillating shuttle-driver, and the shuttle having its delivery-eye at a short distance from the center of the circle of said shuttle-race, and at a point which descends during the latter part of the retrograde movement of the shuttle, so that the shuttle-thread will be pulled home at the finish of the stitch.

6. The combination, substantially as before set forth, of the feed-bar with two rock-shafts, one arranged at each end thereof, and with two rock-shaft arms, positively connected with the feed-bar, the arm of one rock-shaft being arranged lengthwise of the feed-bar and substantially parallel with it, to impart a positive ascending and descending motion thereto, and the arm of the other rock-shaft being arranged crosswise of the feed-bar, to positively reciprocate it endwise.

7. The combination, substantially as before set forth, of the toggle-links, the movable fulcrum-pivot thereof, and the adjustable arm by which said fulcrum-pivot can be adjusted.

8. The combination, substantially as before set forth, of the presser-bar, the cramp-stud, the cam, and the stop-pin.

Witness our hands this 24th day of May, A. D. 1877.

LEBBEUS BALDWIN MILLER.
PHILLIP DIEHL.

Witnesses:
HENRY PFARRER,
JAMES MEEHAN.